(12) United States Patent
Edde

(10) Patent No.: US 6,795,510 B2
(45) Date of Patent: Sep. 21, 2004

(54) APPARATUS AND METHOD FOR SYMBOL TIMING RECOVERY

(75) Inventor: Gabriel Alfred Edde, Indianapolis, IN (US)

(73) Assignee: Thomson Licensing S.A., Boulogne-Billancourt (*) Notice: Subject to any disclaimer, the term of this patent is extended or adjusted under 35 U.S.C. 154(b) by 0 days.

(21) Appl. No.: 10/122,712

(22) Filed: Apr. 12, 2002

(65) Prior Publication Data

US 2003/0194024 A1 Oct. 16, 2003

(51) Int. Cl.[7] .............................................. H04L 27/14
(52) U.S. Cl. ....................................................... 375/326
(58) Field of Search ................................. 375/340, 326, 375/355, 358, 359, 360, 316; 370/503; 455/260

(56) References Cited

U.S. PATENT DOCUMENTS

| | | | | |
|---|---|---|---|---|
| 5,355,161 A | * | 10/1994 | Bird et al. ..................... 725/22 |
| 5,566,213 A | * | 10/1996 | Carsello ..................... 375/344 |
| 5,574,756 A | * | 11/1996 | Jeong ......................... 375/376 |
| 5,987,073 A | * | 11/1999 | Knutson ..................... 375/326 |
| 6,084,931 A | * | 7/2000 | Powell et al. ............... 375/355 |
| 6,144,714 A | * | 11/2000 | Bleiweiss et al. ........... 375/376 |
| 6,208,481 B1 | * | 3/2001 | Spurbeck et al. ............ 360/65 |
| 6,266,545 B1 | * | 7/2001 | Backman et al. ........... 455/572 |
| 6,347,128 B1 | * | 2/2002 | Ransijn ..................... 375/376 |
| 6,377,642 B1 | * | 4/2002 | Dollard ..................... 375/355 |
| 6,389,548 B1 | * | 5/2002 | Bowles ...................... 713/500 |
| 6,493,163 B1 | * | 12/2002 | Reed et al. .................. 360/51 |
| 2003/0123571 A1 | * | 7/2003 | Scheffler .................... 375/316 |

* cited by examiner

Primary Examiner—Emmanuel Bayard
(74) Attorney, Agent, or Firm—Joseph S. Tripoli; Joseph J. Laks; Ronald H. Kurdyle

(57) ABSTRACT

A symbol timing recovery detector receives a sample stream, representing an input signal having successive symbol times sampled at successive sample times. The sample stream includes samples representing successive symbols alternating with samples representing transitions between surrounding symbol representative samples. The detector includes a first circuit which determines a transition value from a transition representative sample and surrounding symbol representative samples. A second circuit determines the slope between the surrounding symbol representative samples. A third circuit generates a signal representing the phase error between the sample times and the symbol times of the input signal from the slope and the transition value.

15 Claims, 10 Drawing Sheets

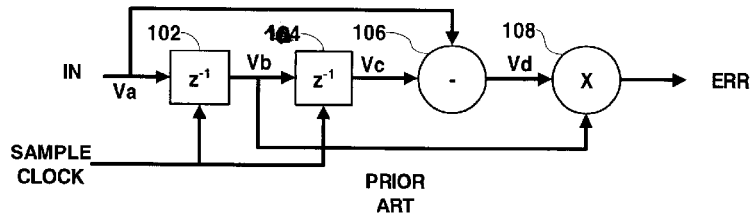
Fig. 1 – Prior art
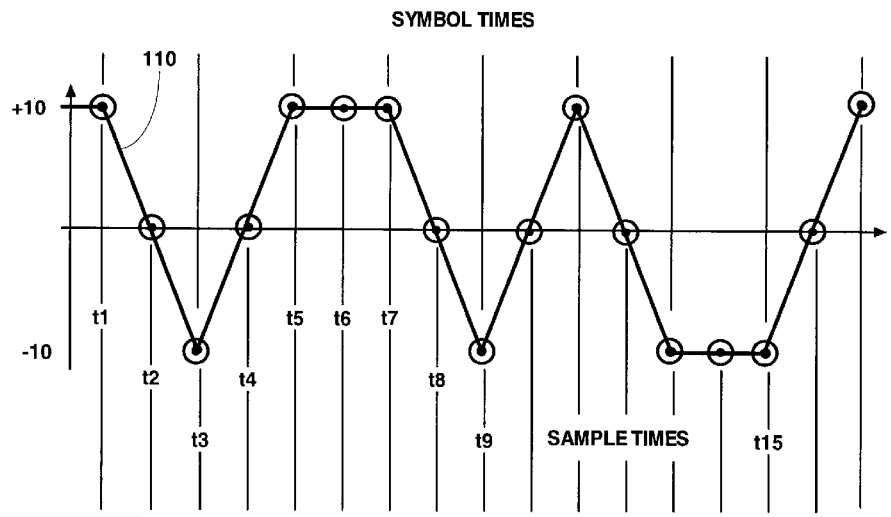
Fig. 2 – On time samples

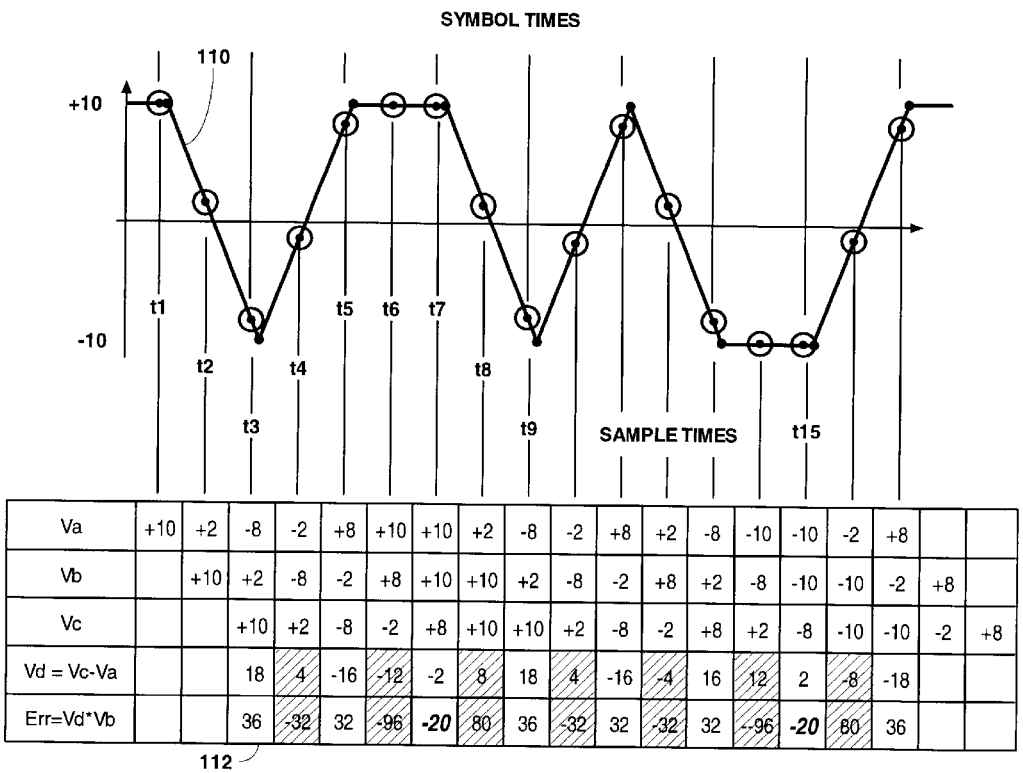
Fig. 3 - Early samples

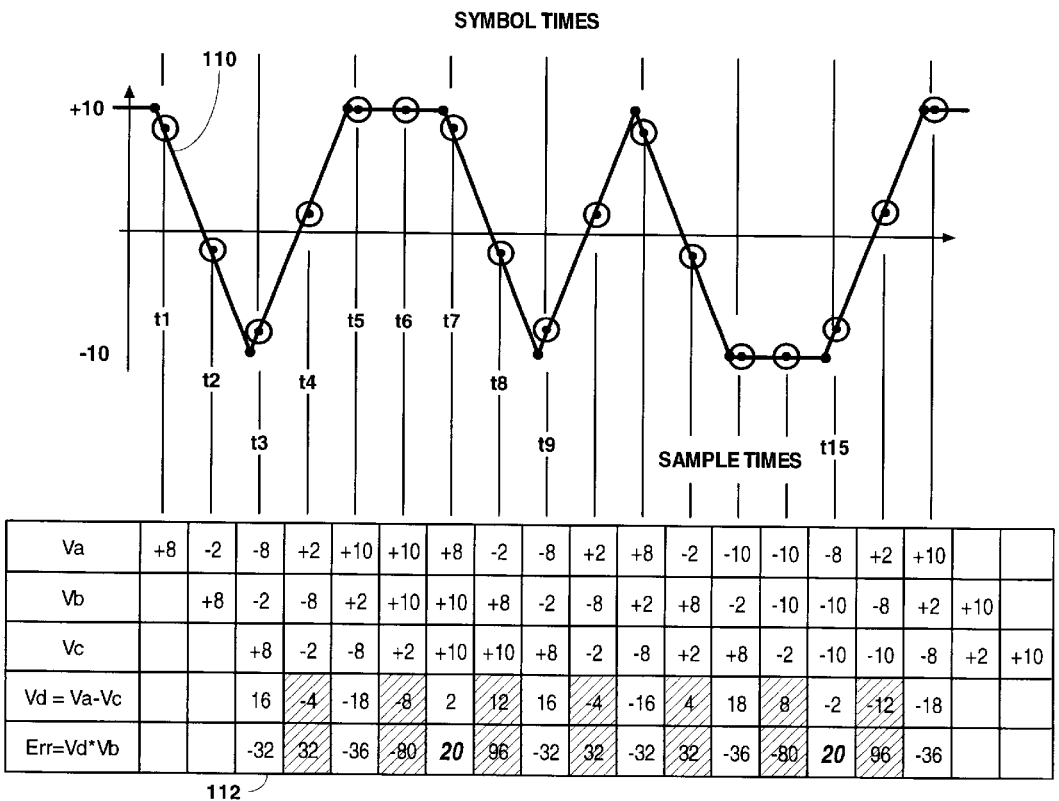
Fig. 4 – Late sample
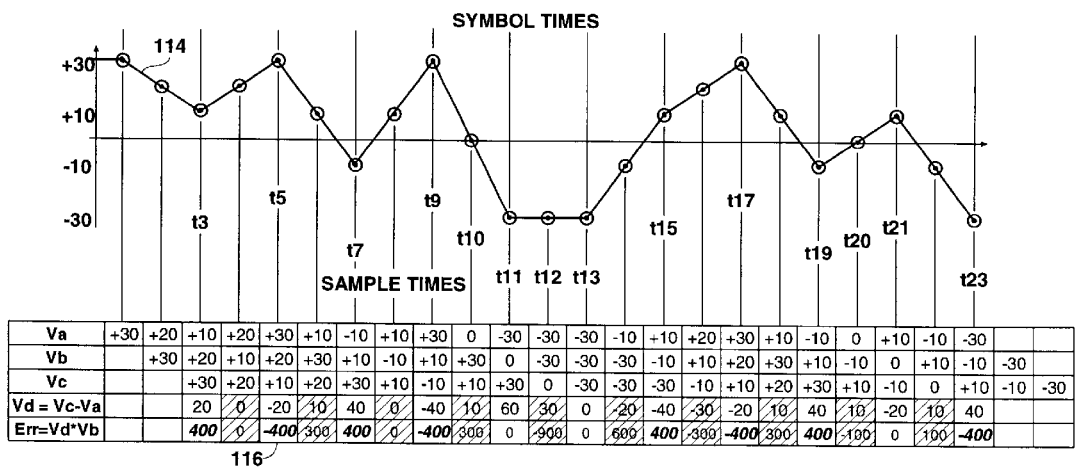
Fig. 5 – Multilevel on time samples

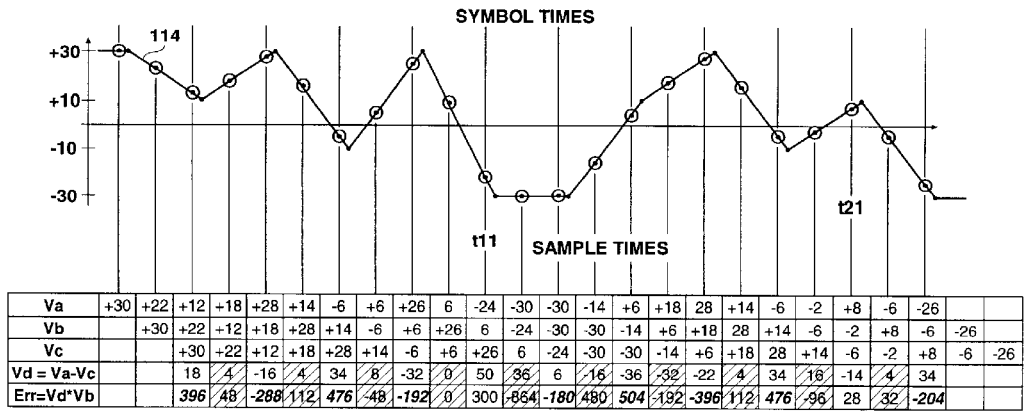
Fig. 6 – Multilevel early samples
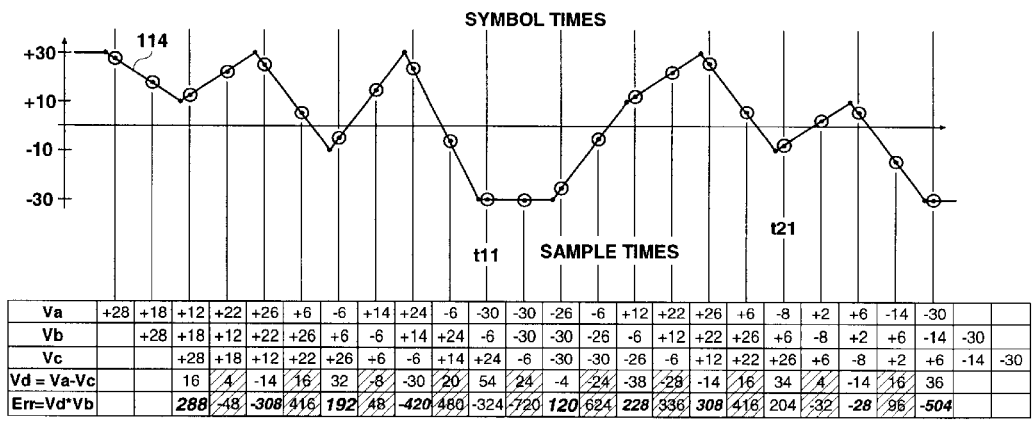
Fig. 7 – Multilevel late samples

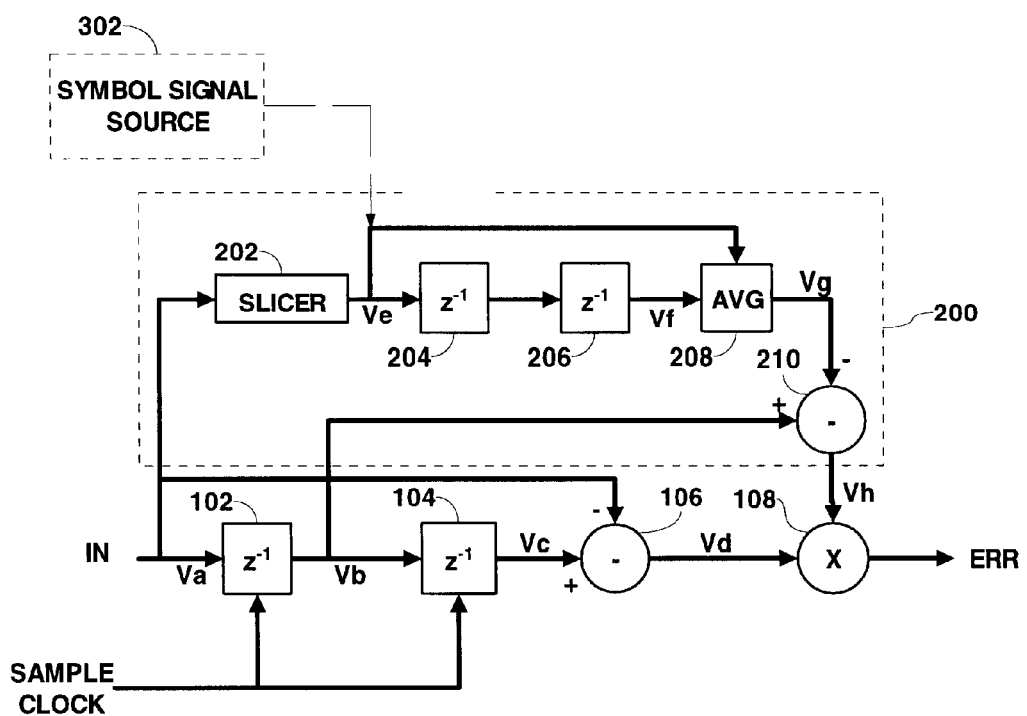
Fig. 8 - Invention

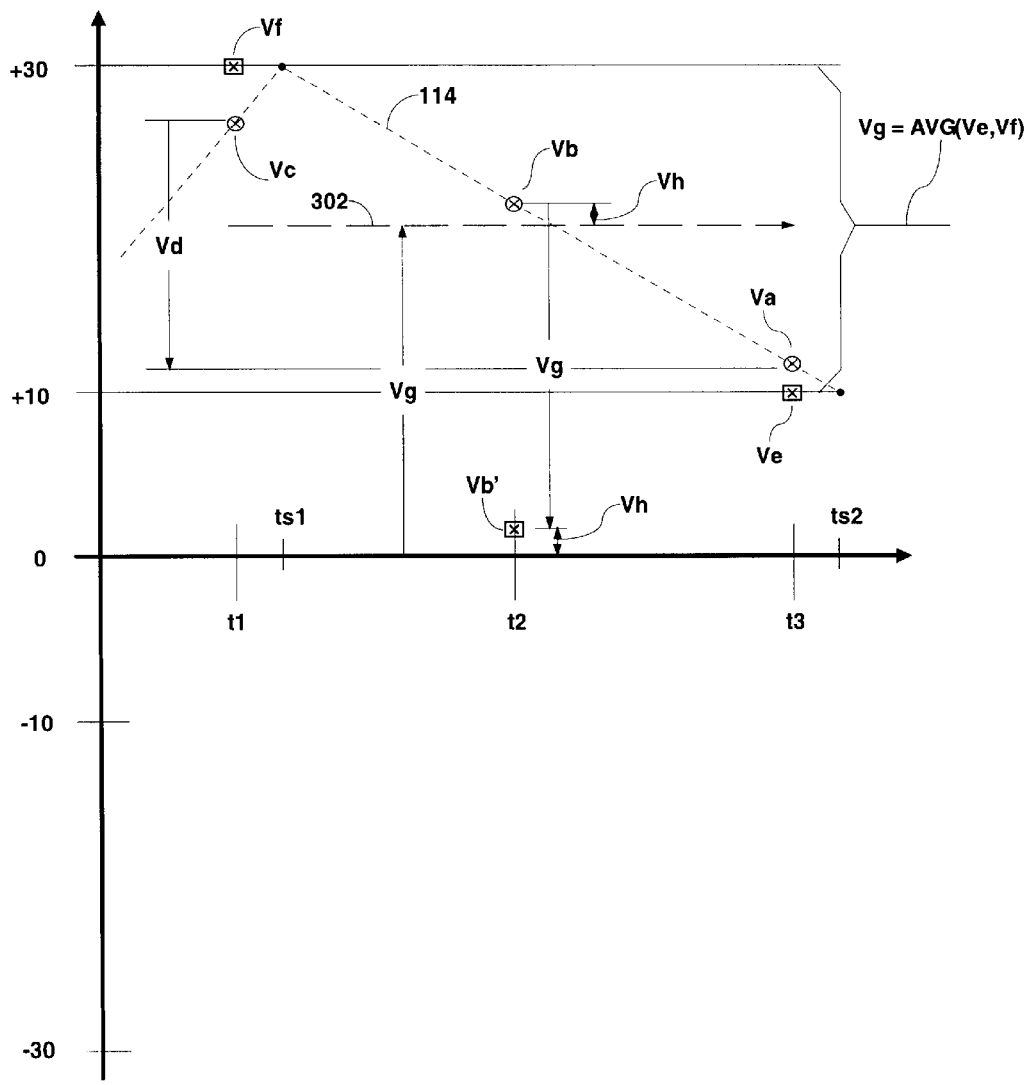
Fig. 9 – New detailed waveform

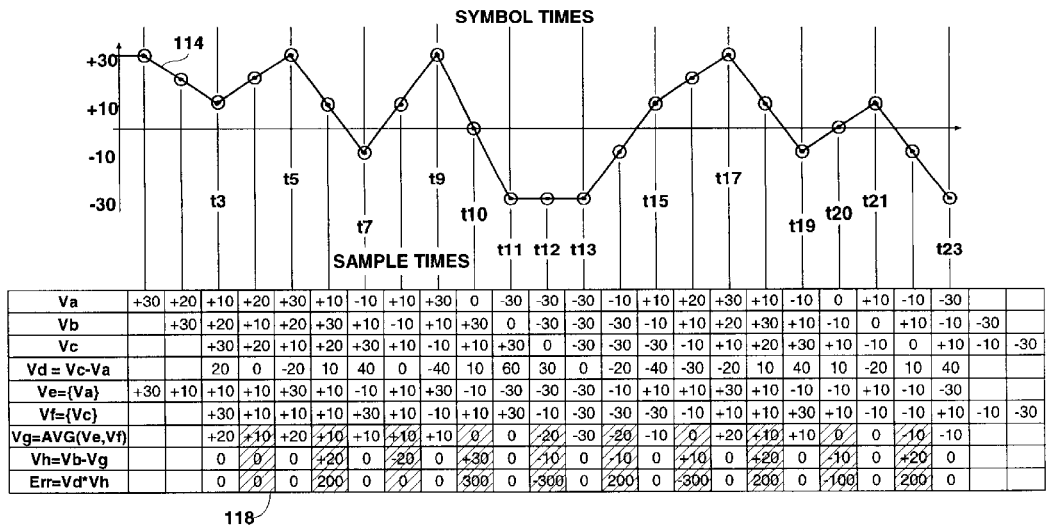
Fig. 10 – New multilevel on time samples
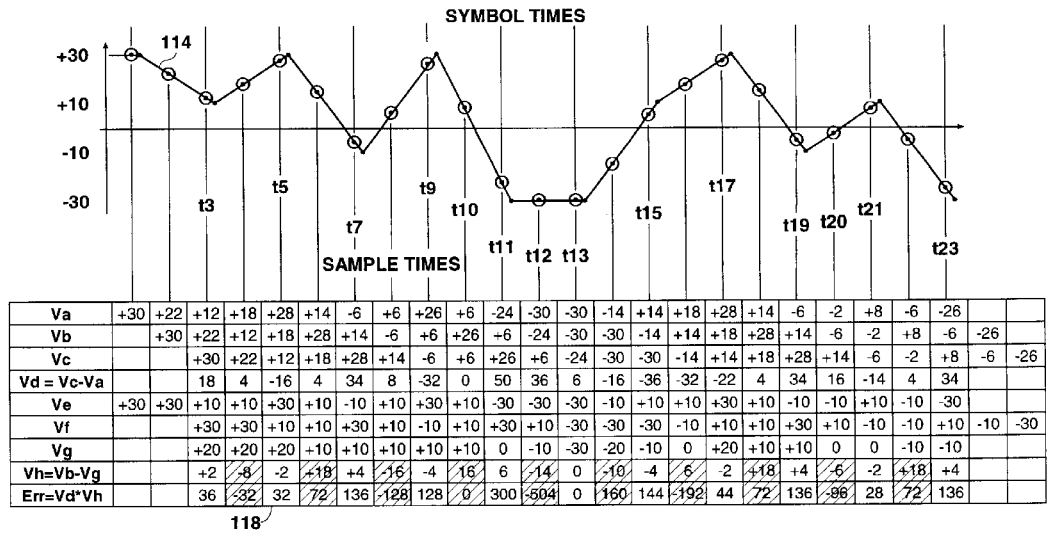
Fig. 11 – New multilevel early samples

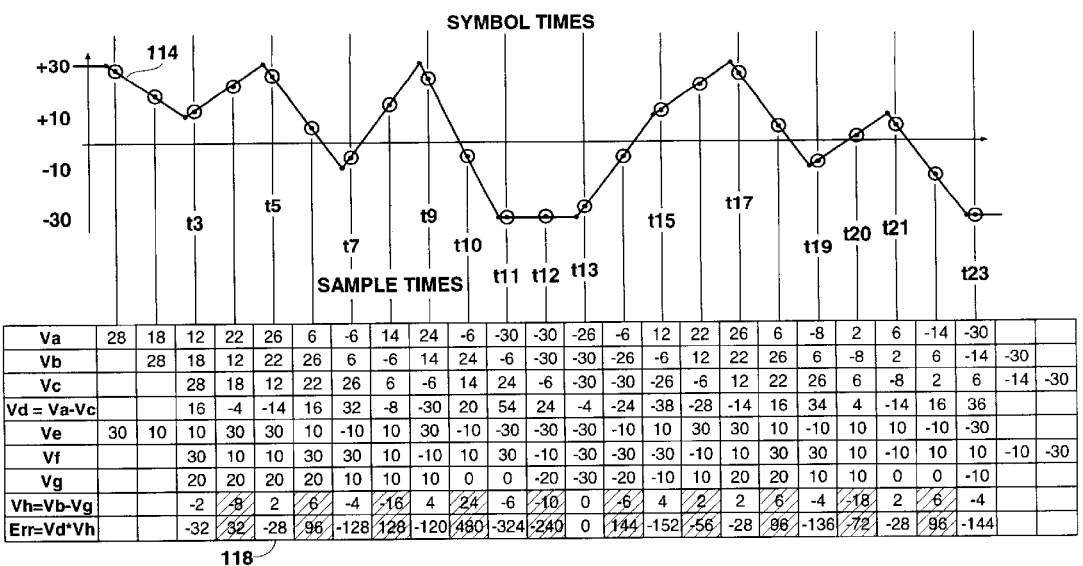
Fig. 12 – New multilevel late samples

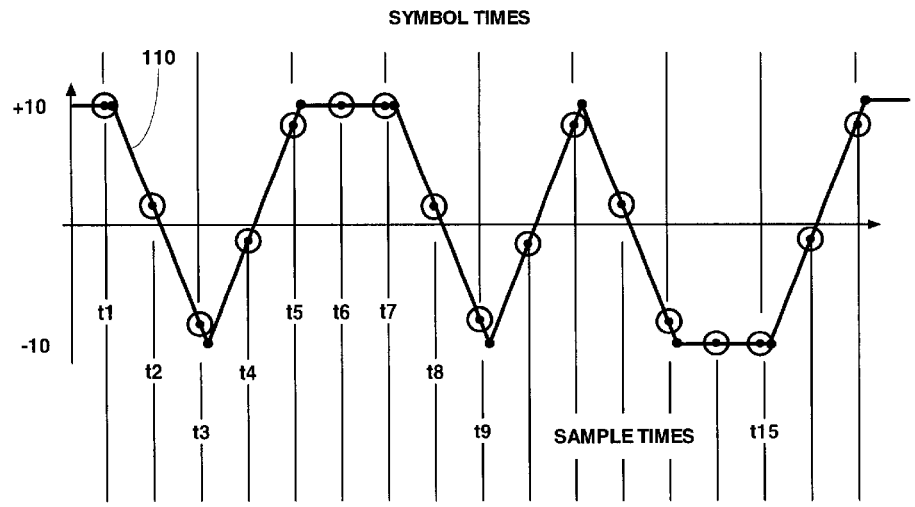
Fig. 13 – New early samples

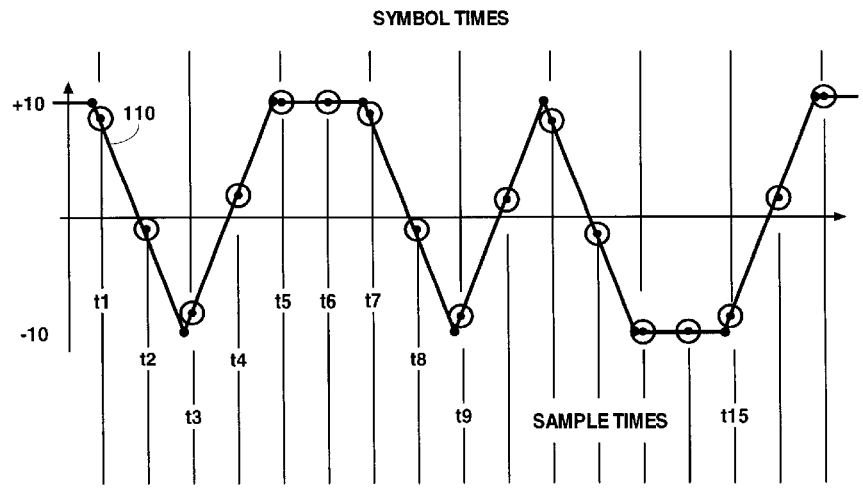
Fig. 14 – New late samples

APPARATUS AND METHOD FOR SYMBOL TIMING RECOVERY

FIELD OF THE INVENTION

The present invention relates to symbol timing recovery detectors and more particularly to digital symbol timing recovery detectors for use in multi-level symbol transmission systems.

BACKGROUND OF THE INVENTION

Digital data communications systems transmit digital data via signals representing successive symbols, each symbol representing a predetermined number of bits, separated by a predetermined time interval. In order to properly receive the transmitted digital data, the timing of the symbols must be recovered. Early symbol timing recovery (STR) detectors were based upon an analog continuous-time techniques. Development of digital data systems led to a corresponding development of sampled data/digital STR detectors.

Mueller and Muller (M&M) developed such a sampled data STR detector that required one sample per data symbol and decision-directed operation. However, in a carrier-type transmission system the M&M STR detector requires prior acquisition of carrier phase for proper operation. The M&M STR detector can operate successfully in a multilevel symbol transmission system, such as an xVSB or xQAM system. However, because the M&M detector is decision-directed, the symbol timing recovery loop will not lock to a signal when the baseband data is so distorted that an accurate decision cannot be made. While an equalizer can correct for these conditions, such equalizers require that the symbol timing be accurate and stable, and are located downstream of the STR detector.

Gardner later developed a sampled data/digital STR detector for bilevel modulation systems, such as BPSK or QPSK. FIG. 1 is a block diagram of the known Gardner STR detector and FIG. 2 is a waveform diagram and table useful in understanding the operation of the Gardner STR detector. In FIG. 1, the sampled input signal IN from a signal sampler (not shown) is coupled to an input terminal of a first delay circuit 102, and a first input terminal of a subtractor 106. An output terminal of the first delay circuit 102 is coupled to an input terminal of a second delay circuit 104 and a first input terminal of a multiplier 108. An output terminal of the second delay circuit 104 is coupled to a second input terminal of the subtractor 106. An output terminal of the subtractor 106 is coupled to a second input terminal of the multiplier 108. An output terminal of the multiplier generates a phase error representative signal ERR. The error signal ERR is coupled to a control input terminal of a timing signal generator (not shown) which, in turn, controls the timing of the samples taken by the signal sampler and supplied to the input terminal IN of the STR detector. A sample clock signal from the timing signal generator is coupled to clock input terminals of the first and second delay circuits 102 and 104.

In FIG. 2, the horizontal axis represents time, and the vertical axis represents the value of the input signal and of the samples representing that signal. In FIG. 2, the waveform 110 represents the received analog signal. The samples of the sampled input signal IN, produced by the signal sampler, are represented by circled dots along the waveform 110. The waveform 110 is illustrated as linear between symbols, though one skilled in the art will understand that this is not necessarily true in actual systems.

As described above, the generation of the samples is synchronized to a sample clock, generated by a sample clock generating circuit (not shown), the phasing of which is controlled by the error signal ERR generated by the STR detector illustrated in FIG. 1, all in a known manner. Sample times are illustrated by thin vertical lines below the waveform 110. The horizontal location of these vertical lines represents the sample times. As is known, the Gardner STR circuit requires two samples per symbol, one sample of which represents the symbol value. Those samples representing the symbols are represented by thin vertical lines above the waveform 110. Symbol time samples (e.g. t1, t3, t5, etc.) alternate with transition time samples (t2, t4, t6, etc.).

In the table 112 beneath the waveform diagram, each row represents the values of the samples in a respective one of the sample streams illustrated in FIG. 1. Each column represents the state of that signal at the corresponding time of the sample illustrated along the waveform 110. That is, the first column represents the sample values at time t1, the second column represents the sample values at time t2 and so forth.

In operation, the first and second delay circuits, 102 and 104, are clocked by the sample clock from the sample clock signal generator (not shown). The sample Va at the input terminal IN, from the sampler (not shown), supplied to the first delay circuit 102, is assumed to be the latest symbol time sample. The top row of the table 112 illustrates the value of the samples Va. The sample Vb at the output terminal of the first delay circuit 102 is delayed by one sample period from the sample Va, and represents the last preceding transition time sample. The second row of the table 112 illustrates the value of the samples Vb. The sample Vc at the output terminal of the second delay circuit 104 is delayed by one sample period from the sample Vb and by two sample periods from the sample Va, and represents the last preceding symbol time sample. The third row of the table 112 illustrates the value of the samples Vc.

In general, the value of the transition sample represents the degree of phase error. That is, if the phase of the sample clock is aligned properly with the symbols in the received signal, the transition sample will be zero. If the transition sample is not zero, this indicates a phase error. The further the transition sample is from zero (either positive or negative), the greater the phase error of the sampling clock.

The slope of the signal between the preceding and succeeding symbol time sample provides the indication of whether the sampling is early or late. If the slope is negative, indicating a transition from a high value to a low value, and the transition sample is positive, this indicates early sampling, and the resulting error signal ERR conditions the sample clock signal generator to retard the phase of the sampling clock signal. In the illustrated embodiment, the error signal is positive to indicate early sampling. If the slope is negative and the transition sample is negative, this indicates late sampling, and the resulting error signal conditions the sample clock signal generator to advance the phase of the sampling clock signal. In the illustrated embodiment, the error signal is negative to indicate late sampling.

Conversely, if the slope is positive, indicating a transition from a low value to a high value, and the transition sample is positive, this indicates late sampling, and the resulting error signal (negative) ERR conditions the sample clock signal generator to advance the phase of the sampling clock signal. If the slope is positive and the transition sample is negative, this indicates early sampling, and the resulting error signal (positive) conditions the sample clock signal generator to retard the phase of the sampling clock signal.

Gardner represents the polarity of the slope of the input signal 110 between adjacent symbol times, Va and Vc, by the difference Vc−Va between the surrounding symbol samples, Va and Vc. Gardner sets the value of the error signal ERR to be the product of the transition sample multiplied by the polarity, i.e. ERR=Vb·(Vc−Va). This value is valid only at sample times, and is illustrated in table 112 by depicting the transition times as being crosshatched.

In FIG. 2, the sample timing is assumed to be properly aligned with the symbol timing of the received signal 110. If there is a symbol transition, and the transition time sample is zero, this indicates that the symbol timing is correct and the error value product, described above, is zero. This is illustrated in FIG. 2 at times t3, t5, t9, etc.

The above holds true only when there is a transition in value from one symbol to the next. If such a transition occurs, then a near-zero transition sample results, and the Gardner STR detector can operate properly. If there is no symbol transition, i.e. if a symbol is repeated, then there is no near-zero transition sample, and the operation of the Gardner STR detector depends upon whether the sample clock is accurately aligned with the symbol timing of the received signal, or not.

If the sample timing is accurately aligned with the symbol timing of the received signal, then the difference between the symbol time samples Va and Vc is zero which accurately reflects the slope of the input signal 110. In this situation, the error value product ERR, described above, remains zero. Referring to time t7 of FIG. 2, the latest symbol time sample Va value is +10 and the previous symbol time sample Vc value is also +10. In this case, the transition time sample Vb is also +10. The difference between the latest and previous symbol time samples is 0. Thus, the error value product ERR is zero. This is also illustrated in FIG. 2 by the column in table 112 representing the time t15.

However, if the sample timing is not accurately aligned with the symbol timing of the received signal, then the Gardner STR detector itself generates noise in the error signal ERR which is termed internal noise below. This internal noise is generated because a near-zero transition representative sample does not occur between two symbol representative samples. This is illustrated in FIG. 3 in which early sampling takes place. Because the sample timing is early, the error signal should be positive. Such an error signal is correctly produced where there is a near-zero transition between symbols, i.e. at times t3, t5, t9, etc. Times t7 and t15, however, represent symbol times at which no transition occurred so the transition sample is not near-zero. At these times, the error signal ERR is erroneously negative, and is illustrated emphasized in bold and italics. Similarly, in FIG. 4 late sampling takes place. In this case, the error signal should be positive. Such an error signal is correctly produced where there is a transition, i.e. at times t3, t5, t9, etc. Times t7 and t15, however, represent symbol times at which no transition occurred so the transition sample is not near-zero. At these times, the error signal ERR is erroneously positive, and is illustrated emphasized in bold and italics.

The problem of the generation of internal noise also occurs in the Gardner STR detector when a multilevel signal is processed. For such signals, when a transition occurs through the zero level between surrounding symbol-time samples representing symbols symmetric around the zero level, then the error signal ERR is generated accurately. However, if a transition occurs through the zero lever between surrounding symbol-time samples which are not symmetric around the zero level, then internal noise is generated because the two surrounding symbol-time samples are not equidistant from the zero level. Finally, when processing a multilevel signal, the Gardner STR detector also generates internal noise when there is not a near-zero level transition sample between surrounding symbol-time samples, as described above.

FIG. 5 is a waveform diagram with corresponding data table 116 which is similar in form to those illustrated in FIG. 2 through FIG. 4, except illustrating the processing of a multilevel signal 114 by a Gardner STR detector (of FIG. 1). In FIG. 5, the sample timing is accurately aligned with the symbol times of the received signal 114. Referring to FIG. 5, times t11 and t21 illustrate symbol times where a zero valued transition sample (t10, t20) occurs between surrounding symbol time samples, (t9, t11 & t19, t21) which are symmetric around the zero level. Consequently, the error signal ERR is correctly calculated as 0. Similarly, time t13 illustrates a symbol time where no transition occurred between successive symbols. The error signal ERR for this time is also correctly calculated as 0 because the sample timing is accurately synchronized to the symbol timing in the received signal.

All of the other symbol time error signal ERR values are internal noise unrelated to the synchronization of the sample clock to the symbol times in the received signal. More specifically, although the multilevel signal 114 passes through zero between symbol-time samples at times t5 & t7, t7 & t9, t13 & t15, t17 & t19, t19 & t21, and t21 & t23, the symbol-time samples surrounding these transitions are not symmetric around the zero level. Consequently, the error signal ERR at the corresponding times t7, t9, t15, t19, t21 and t23 is inaccurately not zero. Such non-symmetric zero crossings are another source of internal noise when a Gardner STR detector processes a multilevel signal. The transitions between such symbols are not near-zero values, consequently the error signal ERR values are incorrectly calculated as non-zero (including both positive and negative) values, which are emphasized in bold and italics.

FIG. 6 is a waveform diagram similar to that of FIG. 5 but illustrating early sampling and FIG. 7 is a waveform diagram similar to that of FIG. 5 and FIG. 6 illustrating late sampling. As described above with reference to FIG. 3, early samples should produce a positive error signal ERR and late samples should produce a negative error signal ERR. However, one skilled in the art will observe in FIG. 6 and FIG. 7 that the necessary condition for proper operation of the Gardner STR detector of transition samples near zero between surrounding symbol-time samples symmetric around the zero level is not always present in multilevel signals. At the times when those conditions are met, such as at times t11 and t21, the Gardner STR detector operates properly on the multilevel signal 114. At all other times, the Gardner STR detector produces internal noise values unrelated to the synchronization of the samples to the symbol times of the received signal.

One skilled in the art will notice in the above description that the traditional Gardner symbol timing recovery detector is not decision-directed. However, Gardner further disclosed that it is possible to use the sign of the symbol time samples instead of the values of the symbol samples, thereby producing a decision directed STR detector. In a Gardner STR detector, acquisition of the data symbol timing is independent of carrier phase, so symbol timing lock may be achieved without requiring prior carrier phase lock. In addition, the Gardner STR detector is designed to work with systems having an excess bandwidth from about 40% to 100%.

In summary, as described above, the Gardner detector is designed to work with bipolar signals, and can operate properly in the presence of channel-related signal degradation. However, the Gardner STR detector performance degrades in multi-level symbol transmission systems, such as xVSB or xQAM, for the reasons described in detail above. Such signals also generally exhibit excess bandwidths of under 40 percent. Under these conditions (multi-level data signal and/or excess bandwidths less than 40%), the traditional Gardner detector will generate internal noise which significantly reduces performance. While the M&M STR detector will work with xVSB and xQAM multi-level signals, as described above, the M&M STR detector exhibits significantly reduced performance in response to degraded signals. An STR detector with improved performance in the presence of a multi-level symbol signal is desirable.

SUMMARY OF THE INVENTION

The inventor has realized that a significant contribution to the internal noise produced when a multi-level symbol signal is processed by a Gardner STR detector is a result of a non-near-zero symbol transition samples, and/or transition samples occurring between surrounding symbol times not symmetric around the zero level. This results in an inaccurate error signal value being generated even if the symbol timing is correct. The inventor has further realized that, by shifting the value of the transition time sample up or down by an appropriate amount, this internal noise may be reduced.

In accordance with principles of the present invention, a symbol timing recovery detector receives a sample stream representing an input signal having successive symbol times sampled at successive sample times. The sample stream includes samples representing successive symbols alternating with samples representing transitions between surrounding symbol representative samples. The detector includes a first circuit which determines a transition value from a transition representative sample and surrounding symbol representative samples. A second circuit determines the slope between the surrounding symbol representative samples. A third circuit generates a signal representing the phase error between the sample times and the symbol times of the input signal from the slope and the transition value.

BRIEF DESCRIPTION OF THE DRAWINGS

FIG. 1 is a block diagram of the Gardner STR detector;

FIG. 2 through FIG. 7 are waveform diagrams and corresponding data tables useful in understanding the operation of the Gardner STR detector illustrated in FIG. 1;

FIG. 8 is a block diagram of an STR detector according to principles of the present invention;

FIG. 9 is a more detailed waveform diagram useful in understanding the operation of the STR detector illustrated in FIG. 8; and FIG. 10 through FIG. 14 are waveform diagrams and corresponding data tables useful in understanding the operation of an STR detector according to principles of the present invention.

DETAILED DESCRIPTION OF THE INVENTION

FIG. 8 is a block diagram of an STR detector according to principles of the present invention. Elements similar to those illustrated in FIG. 1 are designated by the same reference number and are not described in detail below. In FIG. 8, the input terminal IN is further coupled to an input terminal of a slicer 202. An output terminal of the slicer 202 is coupled to an input terminal of a third delay circuit 204 and a first input terminal of an averager 208. An output terminal of the third delay circuit 204 is coupled to an input terminal of a fourth delay circuit 206. An output terminal of the fourth delay circuit 206 is coupled to a second input terminal of the averager 208. An output terminal of the averager 208 is coupled to a subtrahend input terminal of a subtractor 210. The output terminal of the first delay circuit 102 is coupled to the minuend input terminal of the subtractor 210. An output terminal of the subtractor 210 is coupled to the first input terminal of the multiplier 108. The combination of the slicer 202, the third and fourth delay circuits 204 and 206, the averager 208 and the subtractor 210 forms a circuit 200 for determining a transition value.

FIG. 9 is a more detailed waveform diagram of a single symbol time period useful in understanding the operation of the STR detector illustrated in FIG. 8. As described above, a condition for accurate operation of a Gardner-type STR detector is that a near-zero valued transition representative sample occur between two surrounding symbol representative samples symmetric around the zero level. This occurs naturally in a bilevel signal when a transition occurs because the sole two symbol levels are defined to be symmetric with respect to the zero level. However, this does not always occur in multilevel signals. The STR detector illustrated in FIG. 8 modifies the value of the transition representative sample so that it is near-zero valued. This is done by averaging the values of the symbol representative samples surrounding the transition representative sample, and subtracting that average from the value of the transition sample.

In FIG. 9, a portion of the received multilevel signal 114 is illustrated by a dotted line. Symbol times in the received signal are represented by small filled circles on the received signal 114, and occur at times ts1 and ts2. Samples of the received signal 114 are taken at times t1, t2 and t3, and are represented on FIG. 9 as circles with crosses in them: sample Va is taken at time t3, sample Vb is taken at time t2 and sample Vc is taken at time t1. These samples correspond respectively to the input to the first delay circuit 102, the input to the second delay circuit 104 and the output of the second delay circuit 104 as illustrated in FIG. 8. One skilled in the art will observe that in FIG. 9 the sample timing is early relative to the symbol timing of the received signal.

Slicer 202 estimates the symbol which is most likely represented by the actual symbol time sample and generates a sliced sample which has the value of an ideal sample which represents the estimated symbol. In FIG. 9, the multilevel signal has symbols represented by a signal value of either +30, +10, −10 or −30. Thus, in the embodiment illustrated in FIG. 9, all symbol time samples having values between +20 and +40 are assumed to represent an actual symbol sample of +30; those between 0 and +20 are assumed to be +10; those between 0 and −20 are assumed to be −10; and those between −20 and −40 are assumed to be −30, all in a known manner. These sliced samples are represented in FIG. 9 by boxes with crosses in them.

More specifically, referring to FIG. 9, sample Vc has a value of around +27. Because this sample is closest to the symbol sample value of +30, the slicer 202 generates a corresponding sliced sample Vf having a value of +30. Similarly, the sample Va has a value of around 12, and the slicer 202 generates a corresponding sliced sample Ve having a value of +10. One skilled in the art will understand how to design and fabricate such a slicer 202.

The third and fourth delay circuits 204 and 206 operate to delay the sliced symbol time samples by two sample periods, or one symbol period. The sliced samples Ve and Vf in FIG. 9 represent the signals at the input terminal to the third delay circuit 204 and the output terminal of the fourth delay circuit 206, respectively. Thus, at time t3, two adjacent sliced symbol time samples, Ve and Vf are supplied to the input terminals of the averager 208. The averager 208 generates a value Vg representing the average of these two sliced samples. This value is subtracted from the transition sample Vb by subtractor 210. The resulting value Vh is the calculated transition value. This processing has the effect of moving the transition sample Vb down by the value of the average Vg. This is illustrated in FIG. 9 by an arrow having a length of Vg pointing downward from the transition sample Vb toward the zero axis. A translated transition sample Vb', represented by a box with a cross in it, is illustrated at a distance Vh above the horizontal axis.

Alternatively, this operation may be considered as moving the horizontal zero axis upwards by a distance Vg. This is illustrated in FIG. 9 by an arrow pointing upwards from the horizontal zero axis to a dashed line 302. This dashed line represents a translated zero axis. This translated zero axis is midway between the slice levels +10 and +30. This simulates a bilevel signal with a transition through the zero axis. The transition sample Vb is above this translated zero axis by a distance Vh. The input signal symbol values are symmetric around this translated zero axis, and the transition sample Vb is near the translated zero axis, meeting the criterion for accurate operation of a Gardner-type STR detector. Because the above criterion is met, when the transition value Vh is used instead of the value of the transition sample Vb, the remainder of the STR detector will operate accurately to generate the error signal ERR representing the phase error between the sample times and the symbol times of the input signal. As described above, for the signal 114 portion illustrated in FIG. 9, the slope between the two symbol samples Va and Vc is negative, and the transition sample Vb is above the translated zero axis 302, indicating early sampling.

FIG. 10 is a waveform diagram, with corresponding data table 118, which corresponds to the waveform diagram illustrated in FIG. 5. In FIG. 10, the same multilevel input signal 114 is illustrated sampled at times aligned with the symbol times. The data table 118 includes further rows illustrating the sliced samples Ve={Va} representing the best estimate of the samples Va (in FIG. 10, the operator {x} is intended to indicate a sliced estimate of a sample x), the sliced samples Vf={Vc} representing the best estimate of the samples Vc, the average value Vg of the sliced samples Ve and Vf, the calculated transition value Vh=Vb−Vg, and the error signal ERR=Vd·Vh derived using the STR detector illustrated in FIG. 8. The bottom row of the table 118 in FIG. 10, displaying the error signal ERR values, indicates that the STR detector illustrated in FIG. 8 accurately produces all zero values at the symbol times t3, t5, t7, t9, etc.

FIG. 11 is a waveform diagram with corresponding data table 118, which corresponds to the waveform diagram illustrated in FIG. 6, and is similar to the waveform diagram illustrated in FIG. 10. In FIG. 11, the same multilevel input signal 114 is illustrated, but sampled early with respect to the symbol times of the input signal 114. As described above, when an input signal is sampled early, the error signal ERR should be positive, to condition the sample clock signal generator to retard the phase of the sample clock signal. The bottom row of the table 118 in FIG. 11, displaying the error signal ERR values, indicates that the STR detector illustrated in FIG. 8 accurately produces an error signal with positive values, with the exception of one zero value produced at time t13.

FIG. 12 is a waveform diagram with corresponding data table 118, which corresponds to the waveform diagram illustrated in FIG. 7, and is similar to the waveform diagrams illustrated in FIG. 10 and FIG. 11. In FIG. 12, the same multilevel input signal 114 is illustrated, but sampled late with respect to the symbol times of the input signal 114. As described above, when an input signal is sampled late, the error signal ERR should be negative, to condition the sample clock signal generator to advance the phase of the sample clock signal. The bottom row of the table 118 in FIG. 12, displaying the error signal ERR values, indicates that the STR detector illustrated in FIG. 8 accurately produces an error signal with negative values, with the exception of one zero value produced at time t13.

FIG. 13 is a waveform diagram with corresponding data table 120 which corresponds to the waveform diagram illustrated in FIG. 3. In FIG. 13, the same bilevel input signal 110 is illustrated as in FIG. 3, sampled early with respect to the symbol times in the input signal 110. As described above, when the input signal is sampled early, the error signal ERR should be positive to condition the sample clock signal generator to retard the phase of the sample clock signal. As in FIG. 3, this is done accurately when a transition occurs between symbols symmetric around the zero level from symbol time to symbol time. Furthermore, comparing FIG. 13 to FIG. 3, at times t7 and t15, when no transition occurs, instead of the error signal ERR containing internal noise having a negative value as in FIG. 3, the value of the error signal is zero. The internal noise is, therefore, reduced.

FIG. 14 is a waveform diagram with corresponding data table 120 which corresponds to the waveform diagram illustrated in FIG. 4, and which is similar to the waveform diagram illustrated in FIG. 13. In FIG. 14, the same bilevel input signal 110 is illustrated as in FIG. 4, sampled late with respect to the symbol times in the input signal 110. As described above, when the input signal is sampled late, the error signal ERR should be negative to condition the sample clock signal generator to advance the phase of the sample clock signal. As in FIG. 4, this is done accurately when a transition occurs between symbols symmetric around the zero level from symbol time to symbol time. Furthermore, comparing FIG. 14 to FIG. 4, at times t7 and t15, when no transition occurs, instead of the error signal ERR containing internal noise having a positive value, as in FIG. 4, the value of the error signal is zero. The internal noise is, therefore, reduced.

The STR detector illustrated in FIG. 8, and described in detail above, can provide the advantages of the Gardner STR detector of robust operation during periods of asymmetric data transitions. In addition, the STR detector illustrated in FIG. 8 reduces internal noise, and thereby provides improved performance in the presence of bilevel signals and further provides more accurate operation on multilevel signals.

Referring back to FIG. 8, the slicer 202 is illustrated as providing sliced symbol-valued samples, responsive to the received signal (IN). These symbol-valued samples are averaged to provide the translated value for the transition sample, as is described in detail above. However, one skilled in the art will understand that the symbol-valued samples may be provided by any source. This is illustrated in phantom in FIG. 8 as a symbol value estimator 302. The symbol value estimator 302 replaces the slicer 202 in an alternate embodiment. The symbol value estimator 302 estimates the most likely symbol for each symbol time, and provides symbol time samples having the ideal values corresponding to the estimated symbol. While this corresponds directly to the illustrated slicer 202, it may also be a more sophisticated predictive symbol decoder, and may have an input terminal responsive to circuitry (not shown) further down the signal processing chain.

What is claimed is:

1. A symbol timing recovery detector, comprising:
   an input for receiving a sample stream, representing an input signal having successive symbol times sampled at successive sample times, comprising samples representing successive symbols alternating with samples representing transitions between surrounding symbol representative samples;
   a circuit, responsive to a transition representative sample and surrounding symbol representative samples, for determining a transition value;
   a circuit for determining the slope between the surrounding symbol representative samples; and
   a circuit, responsive to the slope and the transition value, for generating a signal representing a phase error between the sample times and the symbol times of the input signal.

2. The detector of claim 1 wherein the transition value determining circuit comprises:
   circuitry for generating a value representing an average of the surrounding symbol representative samples; and
   circuitry for forming a difference between the average representative value and the value of the transition representative sample to generate the transition value.

3. The detector of claim 2 wherein the difference forming circuit comprises a subtractor having a subtrahend input terminal coupled to the average generator, a minuend input terminal responsive to the transition representative sample, and an output terminal generating the transition value.

4. The detector of claim 2 wherein the average generating circuit comprises:
   a delay circuit, exhibiting a symbol time delay, having an input terminal responsive to the sample stream and generating one of the surrounding symbol samples, and an output terminal generating an other one of the surrounding symbol samples; and
   an averager, having a first input terminal coupled to the input terminal of the delay circuit, a second input terminal coupled to the output terminal of the delay circuit, and an output terminal generating the average representative value.

5. The detector of claim 2 further comprising a symbol-value estimator, coupled to the average generating circuit, for estimating the most likely symbol represented by the symbol sample, and generating a corresponding symbol-valued sample having the ideal sample value for the most likely symbol, wherein the average generating circuitry generates the average value of the ideal-valued surrounding symbol representative samples.

6. The detector of claim 5 wherein the symbol-value estimator comprises a slicer, coupled between the sample stream source and the average generating circuit, wherein the average generating circuit generates the average value of the ideal-valued surrounding symbol representative samples.

7. The detector of claim 1 wherein the slope determining circuit comprises a subtractor, for subtracting one of the surrounding symbol representative samples from the other one of the surrounding symbol representative samples to generate the slope.

8. The detector of claim 7 wherein the slope determining circuit further comprises a delay circuit, exhibiting a delay of one symbol time, having an input terminal responsive to the sample stream and generating the one of the surrounding symbol samples, and an output terminal generating the other one of the surrounding symbol samples.

9. The detector of claim 8 wherein the delay circuit further comprises an intermediate output terminal generating the transition sample, and exhibits a delay of one sample time between the input terminal and the intermediate output terminal, and a delay of one sample time between the intermediate output terminal and the output terminal.

10. The detector of claim 1 wherein the error generating circuit comprises a multiplier, having a first input terminal responsive to the slope and a second input terminal responsive to the transition value and an output terminal generating the phase error representative signal.

11. A method for recovering symbol timing for a sample stream, representing an input signal having successive symbol times sampled at successive sample times, comprising samples representing successive symbols alternating with samples representing transitions between surrounding symbol representative samples, comprising the steps of:
    determining a transition value from a transition representative sample and surrounding symbol representative samples;
    determining the slope between the surrounding symbol representative samples; and
    generating a signal representing a phase error between the sample times and the symbol times from the slope and the transition value.

12. The method of claim 11 wherein the transition value determining step comprises the steps of:
    determining a value representing the average between the surrounding symbol representative samples; and
    generating the difference between the average representative value and the transition representative sample.

13. The method of claim 12 wherein:
    the transition value determining step further comprises the step of estimating the most likely symbol corresponding to each surrounding symbol representative sample and generating estimated samples representing the ideal sample values of the surrounding symbol representative samples; and
    the average determining step comprises the step of determining a value representing the average between the estimated samples representing the surrounding symbol representative samples.

14. The method of claim 11 wherein the slope determining step comprises the step of generating the difference between the surrounding symbol representative samples.

15. The method of claim 11 wherein the phase error signal generating step comprises the steps of multiplying the slope times the transition value.

* * * * *